(12) United States Patent
Lee et al.

(10) Patent No.: US 7,413,335 B2
(45) Date of Patent: Aug. 19, 2008

(54) PRISM SHEET AND BACKLIGHT UNIT INCLUDING THE SAME

(75) Inventors: Seoung Ho Lee, Gyeonggi-do (KR); Sang Gon Lee, Chungcheongbuk-do (KR); Kang Yoon Kim, Chungcheongbuk-do (KR); Chang Jong Kim, Chungcheongbuk-do (KR); Hyun Seok Cho, Daejeon (KR); Jung Hoon Lee, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 304 days.

(21) Appl. No.: 11/303,929

(22) Filed: Dec. 19, 2005

(65) Prior Publication Data

US 2006/0268438 A1 Nov. 30, 2006

(30) Foreign Application Priority Data

May 24, 2005 (KR) .................... 10-2005-0043471

(51) Int. Cl.
*F21V 5/00* (2006.01)
(52) U.S. Cl. ................. 362/626; 362/607; 362/339
(58) Field of Classification Search ................. 362/626, 362/606, 607, 311, 339
See application file for complete search history.

(56) References Cited

U.S. PATENT DOCUMENTS 4,911,529 A * 3/1990 Van De Ven ............... 359/454
5,827,172 A 10/1998 Takahashi et al.
5,852,514 A * 12/1998 Toshima et al. ............. 359/599
6,130,730 A 10/2000 Jannson et al.
6,545,827 B1 4/2003 Okabe et al.
6,822,705 B2 11/2004 Shimoda et al.
6,982,111 B2 1/2006 Mizushima et al.
2001/0030638 A1 10/2001 Kashima

FOREIGN PATENT DOCUMENTS

| EP | 1 426 941 A1 | 6/2004 |
|---|---|---|
| JP | 2003-203338 A | 7/2003 |
| JP | 2005-25154 A | 1/2005 |
| KR | 10-2004-0020063 A | 3/2004 |
| TW | 1221210 | 9/2004 |
| TW | M264521 | 5/2005 |

* cited by examiner

*Primary Examiner*—Laura Tso
(74) *Attorney, Agent, or Firm*—Birch, Stewart, Kolasch & Birch, LLP (57) ABSTRACT

The present invention relates to a prism sheet having a side which is perpendicular to the normal of a light guiding plate. The prism sheet includes a prism sheet base film and a plurality of linearly aligned prisms. The prisms are formed on one side of the prism sheet base film. Here, one side of each prism is perpendicular to the prism sheet base film. The prism sheet condenses a light outputted from a light guiding plate using its internal total reflection, and so the efficiency of the light is enhanced.

10 Claims, 6 Drawing Sheets

FIG. 1

[RELATED ART]

FIG. 2A

[RELATED ART]

FIG. 2B

[RELATED ART]

FIG. 2C

[RELATED ART]

PRISM SHEET AND BACKLIGHT UNIT INCLUDING THE SAME

BACKGROUND OF THE INVENTION

1. Field of the Invention

The present invention relates to a prism sheet and a backlight unit including the same. More particularly, the present invention relates to a prism sheet having a side which is perpendicular to the normal of a light guiding plate and a backlight unit including the same.

2. Description of the Related Art

A backlight unit provides a light to a liquid crystal display (hereinafter, referred to as "LCD").

Figure 1:
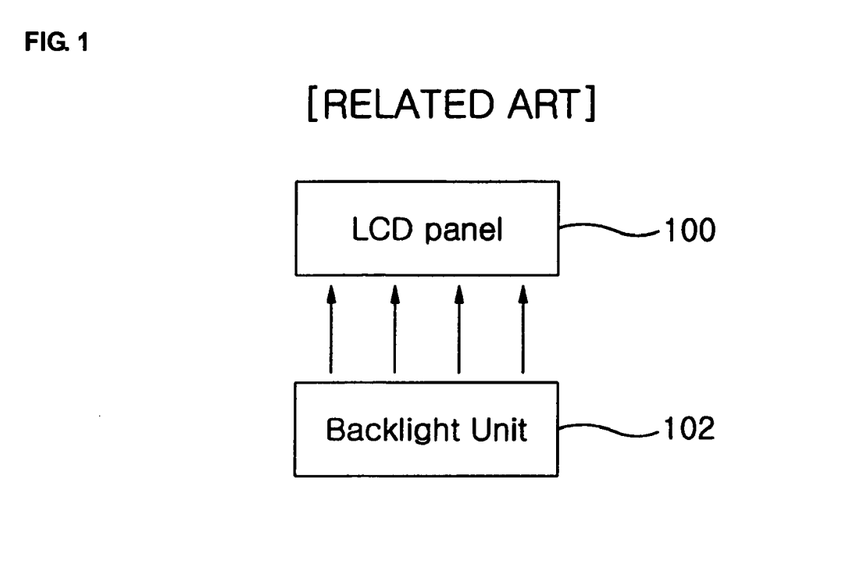
FIG. 1 is a block diagram illustrating a usual liquid crystal device.

FIG. 1 is a block diagram illustrating a usual liquid crystal device.

In FIG. 1, the LCD includes a LCD panel 100 and a backlight unit 102.

The LCD panel 100 displays a certain image using a light provided from the backlight unit 102.

Figure 2A:
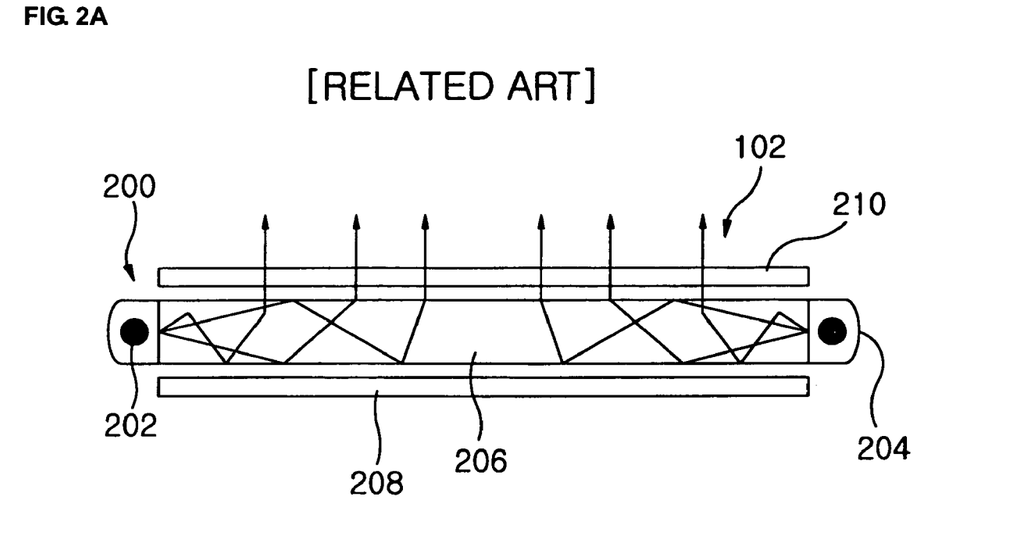
FIG. 2A is a sectional view illustrating a backlight unit.
Figure 2B:
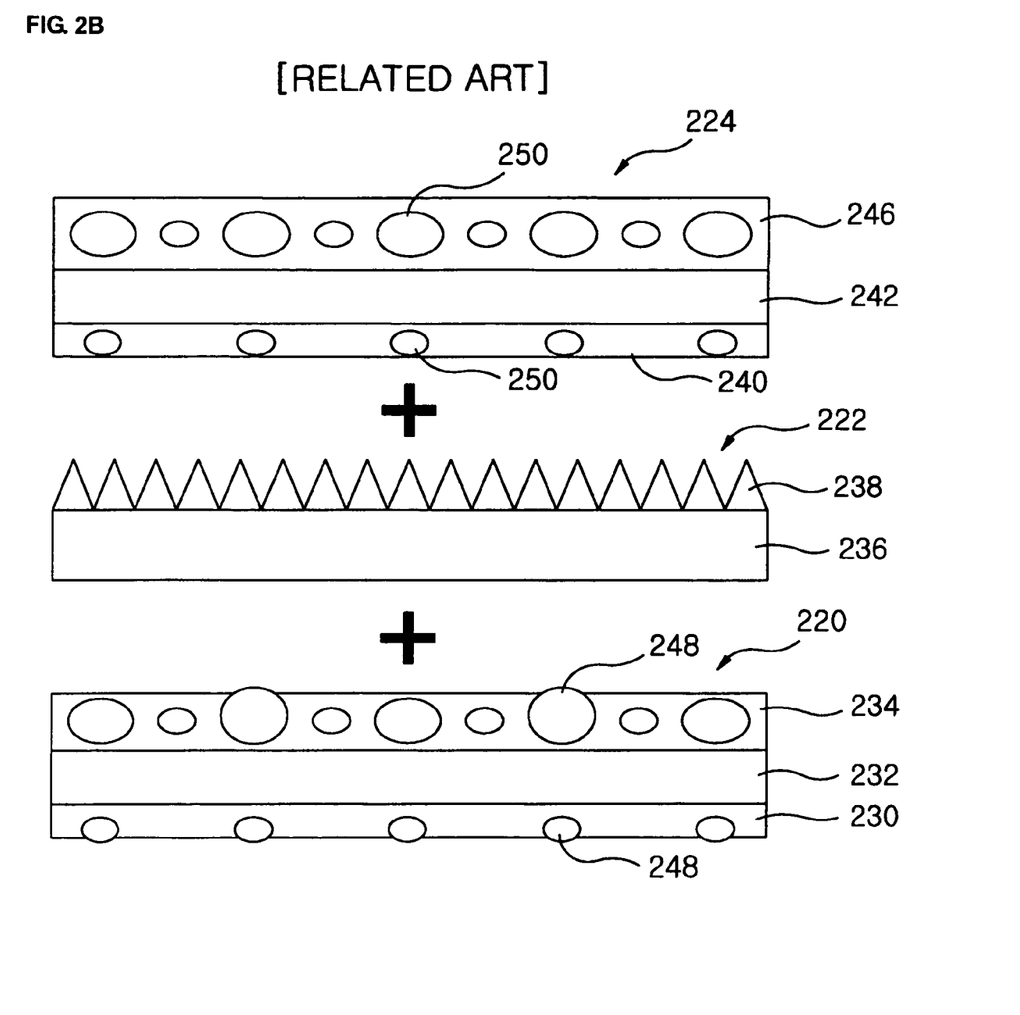
FIG. 2B is a sectional view illustrating an optical film of FIG. 2A.

FIG. 2A is a sectional view illustrating a backlight unit. FIG. 2B is a sectional view illustrating an optical film of FIG. 2A.

In FIG. 2A, the backlight unit 102 includes a light source unit 200, a light guiding plate 206, a reflection sheet 208 and an optical film 210.

The light source unit 200 includes at least one cold cathode fluorescent lamp (hereinafter, referred to as "CCFL") 202 and a reflection plate 204.

The CCFL 202 emits a light having a certain wavelength. Here, the light is generally a white light.

The reflection plate 204 seals the CCFL 202, and reflects the light emitted from the CCFL 202.

The light guiding plate 206 controls reflection condition of its upper side and lower side to diffuse uniformly the light emitted from the light source unit 200 through the whole light guiding plate 206. In addition, the light guiding plate 206 outputs the diffused light in the direction of the LCD panel 100.

The reflection sheet 208 reflects a light leaked from the light guiding plate 206 in the direction of the light guiding plate 206.

In FIG. 2A and FIG. 2B, the optical film 210 includes a diffusion sheet 220, a prism sheet 222 and a protection sheet 224.

The diffusion sheet 220 is located over the light guiding plate 206, and includes a lower diffusion sheet 230, a diffusion sheet base film 232 and an upper diffusion sheet 234. In addition, the diffusion sheet 220 includes beads 248, and condenses or diffuses the light outputted from the light guiding plate 206 using the beads 248.

The prism sheet 222 is located over the diffusion sheet 220, and includes a prism sheet base film 236 and prisms 238. Additionally, the prism sheet 222 condenses a light condensed or diffused by the diffusion sheet 220.

The protection sheet 224 is located over the prism sheet 222, and includes a lower protection sheet 240 includes beads 250, a protection sheet base film 242 and an upper protection sheet 246 includes beads 250. Further, the protection sheet 224 diffuses a light condensed by the prism sheet 222, and provides the diffused light to the LCD panel 100.

Figure 2C:
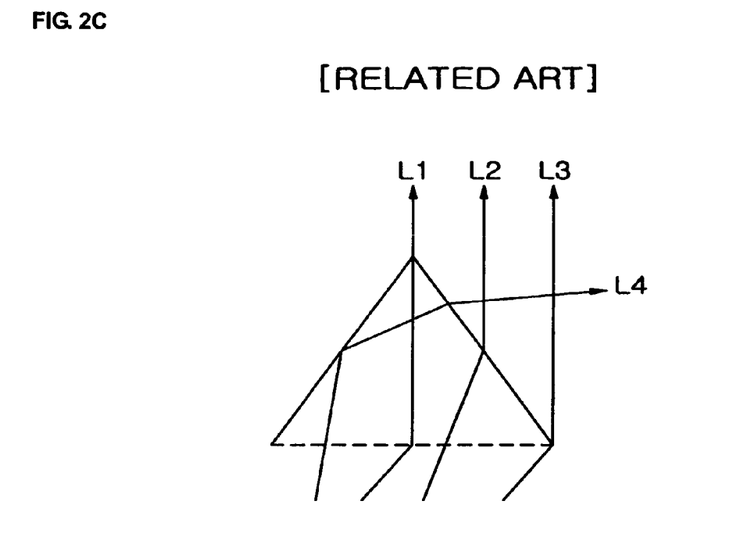
FIG. 2C is a sectional view illustrating a prism.

FIG. 2C is a sectional view illustrating the prism.

In FIG. 2C, the light outputted from the light guiding plate 206 is condensed by the prism 238. Then, the condensed light is transmitted in the direction of the LCD panel 100. However, a part (L4) of the light outputted from the light guiding plate 206 is not condensed in the direction of the LCD panel 100 as shown in FIG. 2C. In other words, the part of the light outputted from the light guiding plate 206 is not incident to the LCD panel 100, and so the efficiency of the light provided to the LCD panel 100 from the backlight unit 102 is reduced.

SUMMARY OF THE INVENTION

It is a feature of the present invention to provide a backlight unit for enhancing the efficiency of a light provided to a LCD panel and a prism sheet included in the same.

A prism sheet according to one embodiment of the present invention includes a prism sheet base film and a plurality of linearly aligned prisms. The prisms are formed on one side of the prism sheet base film. Here, one side of each prism is perpendicular to the prism sheet base film.

The prism sheet according to another embodiment of the present invention includes a prism sheet base film, a plurality of linearly aligned prisms and a diffusion layer. The prisms are formed on one side of the prism sheet base film. The diffusing layer is located on the prism sheet base film, and has a plurality of beads for diffusing a light condensed by the prisms. Here, one side of each prism is perpendicular to the prism sheet base film.

A backlight unit employed in a liquid crystal display according to one embodiment of the present invention a light guiding plate and a prism sheet. The prism sheet has a prism sheet base film, and a plurality of linearly aligned prisms formed on one side of the prism sheet base film and facing the light guiding plate. Here, one side of each prism is perpendicular to the prism sheet base film, and the angle between a vertical plane and an inclined plane in each prism is about 30° to 45°, and the refractive index of substance of the prisms is about 1.5 to 1.6.

As described above, a backlight unit of the present invention condenses a light outputted from a light guiding plate using internal total reflection of a prism sheet, and so the efficiency of the light is enhanced.

In addition, in the backlight unit of the present invention, an incident angle incident to a prism sheet is high, i.e., is similar to a Brewster angle, and thus the polarization efficiency of the backlight unit is enhanced. As a result, the brightness of a LCD including the backlight unit is enhanced.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF EMBODIMENTS

Hereinafter, the preferred embodiments of the present invention will be explained in more detail with reference to the accompanying drawings.

Figure 3:
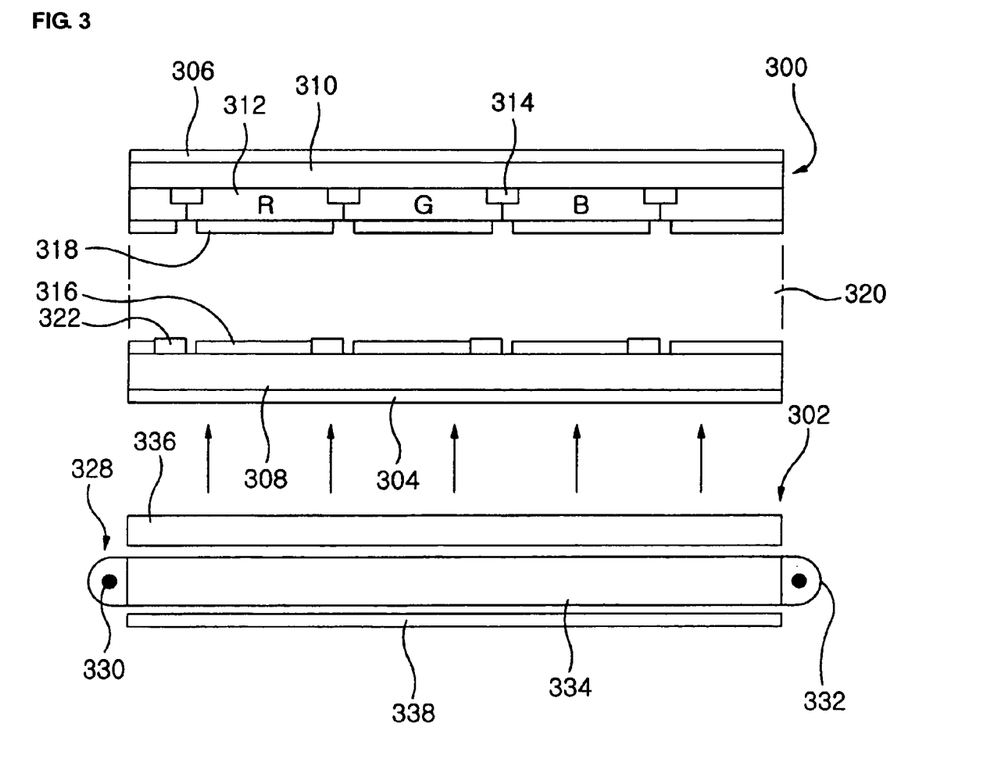
FIG. 3 is a sectional view illustrating a backlight unit according to one embodiment of the present invention.

FIG. 3 is a sectional view illustrating a backlight unit according to one embodiment of the present invention.

In FIG. 3, a liquid crystal display (hereinafter, referred to as "LCD") includes a LCD panel 300 and a backlight unit (hereinafter, referred to as "BLU") 302.

The LCD panel 300 includes a lower polarization film 304, an upper polarization film 306, a lower glass substrate 308, an upper glass substrate 310, a color filter 312, a black matrix 314, a pixel electrode 316, a common electrode 318, a liquid crystal layer 320 and a TFT array 322.

The color filter 312 includes sub-color filters corresponding to red, green and blue light.

The TFT array 322 as switching device switches the pixel electrode 316.

The pixel electrode 316 and the common electrode 318 array liquid crystals of the liquid crystal layer 320 in accordance with a certain voltage applied from the outside.

The liquid crystal layer 320 includes the liquid crystals, wherein the liquid crystals are arrayed depending on voltage difference of the pixel electrode 316 and the common electrode 318. As a result, a light outputted from the backlight unit 302 is incident to the color filter 312 through the disposed liquid crystal.

The BLU 302 is located under the LCD panel 300, and provides a light, for example white light to the LCD panel 300. The BLU 302 includes a light source unit 328, a light guiding plate 334, an optical film 336 and a reflection sheet 338.

The light source unit 328 includes at least one cold cathode fluorescent lamp (hereinafter, referred to as "CCFL") 330 and a reflection plate 332.

The CCFL 330 emits a linear light having a certain wavelength, wherein the linear light is for example white light.

The light source unit 328 according to another embodiment of the present invention may emit a light using a light emitting diode (LED) instead of the CCFL.

The reflection plate 332 seals the CCFL 330, and reflects the light emitted from the CCFL 330.

The light guiding plate 334 controls the reflection condition of its upper side and lower side to diffuse uniformly the light emitted from the light source unit 328 through the whole light guiding plate 334. Additionally, the light guiding plate 334 transmits the diffused light in the direction of the LCD panel 300, wherein the diffused light is outputted from the light guiding plate 334 with a certain output angle.

The reflection sheet 338 reflects a light leaked from the light guiding plate 334 in the direction of the light guiding plate 334.

The optical film 336 condenses or diffuses the light outputted from the light guiding plate 334, and then provides the condensed or diffused light to the LCD panel 300.

Figure 4A:
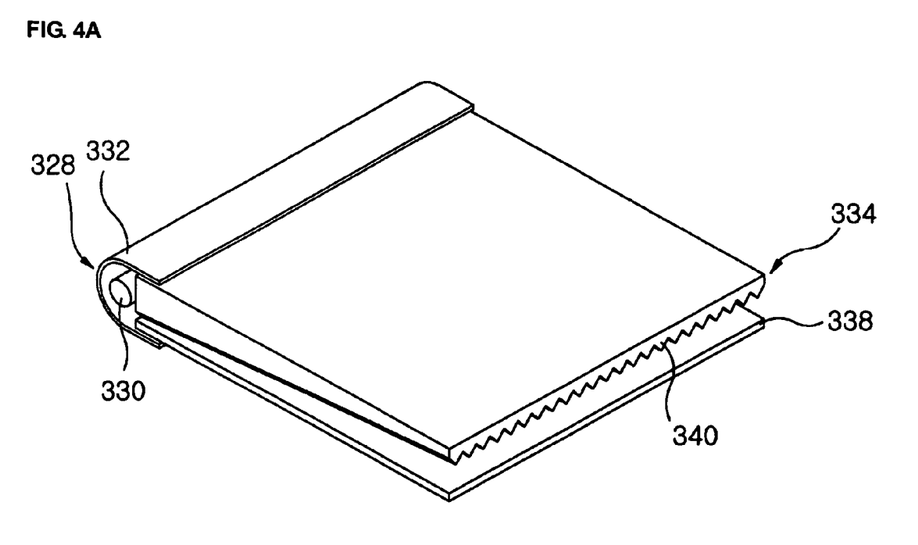
FIG. 4A is a perspective view illustrating schematically the light source unit and the light guiding plate of FIG. 3.

FIG. 4A is a perspective view illustrating schematically the light source unit and the light guiding plate of FIG. 3.

In FIG. 4A, the light guiding plate 334 is reduced in view of thickness the farther it gets from the CCFL 330 to output uniformly the light incident from the CCFL 330 through its upper surface. In addition, a plurality of prism mountains 340 are linearly disposed on the lower surface of the light guiding plate 334 as shown in FIG. 4A, and have a triangle shape, respectively. A diffusion layer (not shown) for scattering a light may be formed on the upper surface of the light guiding plate 334. As a result, the light guiding plate 334 provides the light emitted from the CCFL 330 in the direction of the LCD panel 300 with a predetermined angle.

Figure 4B:
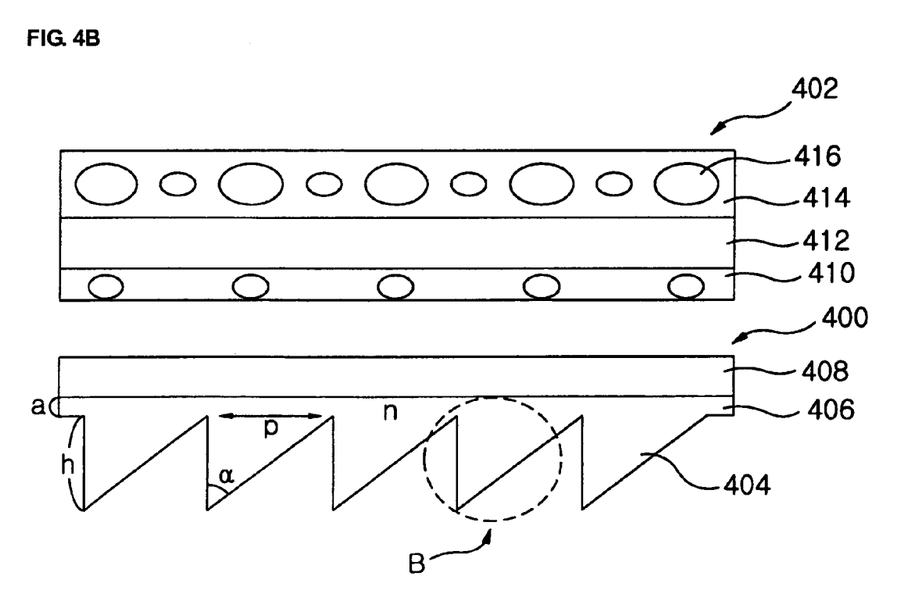
FIG. 4B is a sectional view illustrating the optical film of FIG. 3 according to a first embodiment of the present invention.

FIG. 4B is a sectional view illustrating the optical film of FIG. 3 according to a first embodiment of the present invention.

In FIG. 4B, the optical film 336 includes a prism sheet 400 and a protection sheet 402.

The prism sheet 400 condenses the light outputted from the light guiding plate 334. Further, the prism sheet 400 includes prisms 404, a prism base 406 and a prism sheet base film 408.

The prism sheet base film 408 supports the prisms 404 and the prism base 406.

The prism base 406 combines the prism sheet base film 408 with the prisms 404, and enhances heat resisting characteristics and bending characteristics of the prism sheet 400. In addition, the prisms 404 may be easily formed due to the prism base 406.

The prisms 404 are linearly aligned on one side of the prism base 406 as shown in FIG. 4B, and its vertexes face the light guiding plate 334. Additionally, one side of at least one prism is perpendicular to the prism sheet base film 408.

In the prism sheet 400 according to one embodiment of the present invention, the distance between the prisms 404, i.e., pitch (p) is about 10 μm to 100 μm, and a vertical angle (α). i.e., an angle between a vertical plane and an inclined plane is about 30° to 45°. In addition, each of the prisms 404 is made up of UV curable resin having a refractive index (n) of about 1.5 to 1.6.

The height (a) of the prism base 406 is the same as, or more than 10 percents of the height (h) of a vertical plane of the corresponding to prism, that is, a≧0.1 h. Here, an angle between the light outputted from the light guiding plate 334 and the normal of the light guiding plate 334 is one of angles of less than about 90°. In other words, the vertical angle (α) of each of prisms 404 is appropriately set between about 30° and 45° in accordance with an angle of the light outputted from the light guiding plate 334. As a result, the light outputted from the light guiding plate 334 is condensed by the prisms 404.

For example, in case that the angle between the light outputted from the light guiding plate 334 and the normal of the light guiding plate 334 is about 60° to 80°, it is set that the refractive index (n) of the prisms 404 is about 1.5 to 1.6, and the vertical angle (α) is about 35° to 42°. It is desirable that the refractive index of the prisms 404 is about 1.57, the vertical angle (α) is about 40°, and the angle between the light outputted from the light guiding plate 334 and the normal is about 75°.

Operation of the prism sheet 400 will be described in detail with reference to the accompanying drawing.

The prism sheet 400 according to another embodiment of the present invention may condense a light outputted from other device than the light guiding plate 334.

The protection sheet 402 is located over the prism sheet 400, and includes a lower protection sheet 410, a protection sheet base film 412 and an upper protection sheet 414.

The lower protection sheet 410 includes beads 416, and diffuses the light condensed by the prism sheet 400 using the beads.

At least one bead 416 according to one embodiment of the present invention is made up of poly methyl meta acrylate (PMMA).

The protection sheet base film 412 supports the lower protection sheet 410 and the upper protection sheet 414.

The upper protection sheet 414 diffuses a light transmitted through the lower protection sheet 410 and the protection sheet base film 412 using the beads 416. As a result, the view angle of the LCD panel 300 is enhanced.

The protection sheet 402 protects the prism sheet 400 from dust, etc.

Figure 5:
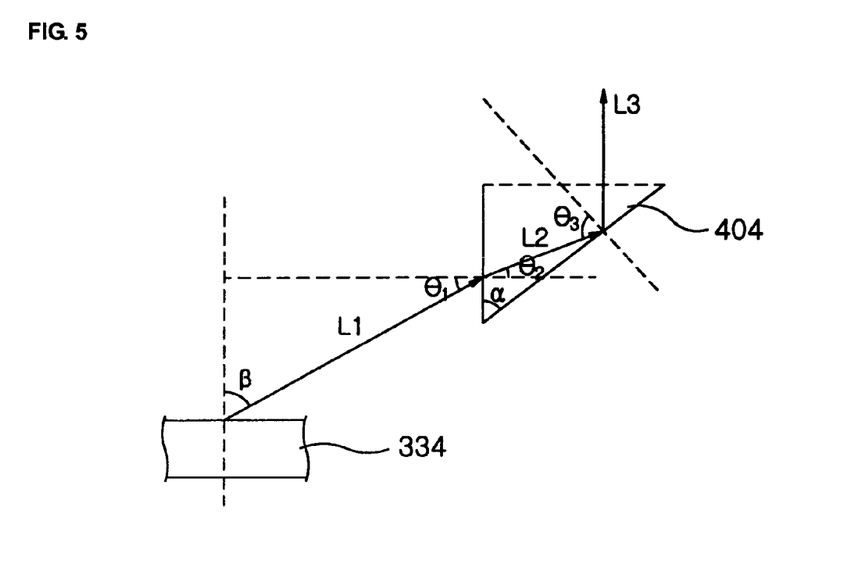
FIG. 5 is a sectional view illustrating enlarged B part in FIG. 4B.

FIG. 5 is a sectional view illustrating enlarged B part in FIG. 4B.

In FIG. 5, a light (L1) outputted from the light guiding plate 334 with a predetermined angle is incident to the vertical plane of the corresponding prism 404. Particularly, the light (L1) is incident to the vertical plane, wherein an angle between the light (L1) and the normal of the light guiding plate 334 is β. Here, the vertical plane is parallel to the normal of the light guiding plate 334 as shown in FIG. 5. Hence, the incident angle (θ1) of the light (L1) incident to the vertical plane is 90°−β.

The light (L1) is transmitted through the vertical plane with an angle (θ2). In this case, the light (L1) is changed into a light (L2) by the vertical plane.

A light (L2) is incident to the inclined plane of the prism 404. In this case, the light (L2) is totally reflected at the inclined plane.

In short, the light (L1) outputted from the light guiding plate 334 is condensed by the prisms 404.

Hereinafter, operation of the prism sheet 400 will be described in detail.

For example, the refractive index (n) of one of the prisms 404 is 1.57, and the vertical angle (α) of the one is about 40°. In addition, the angle (β) between the light (L1) and the normal of the light guiding plate 334 is about 75°.

In this case, θ1 is 15° (90°−β).

Subsequently, θ2 will be calculated by using Equation 1 (Snell's law).

$$n \text{ (refractive index of the prism)}/1 \text{ (refractive index of air)} = \sin\theta1/\sin\theta2 \quad \text{[Equation 1]}$$

θ2 calculated by using Equation 1 is 9.489°.

$$90°-\theta3=180°-(90°+\theta2+\alpha) \quad \text{[Equation 2]}$$

θ3 calculated by using Equation 2 is 49.489°.

Hereinafter, a critical angle (θ$_c$) at which total reflection is generated will be calculated.

$$1 \text{ (refractive index of air)}/1.57 \text{ (refractive index of the prism)} = \sin\theta_c \quad \text{[Equation 3]}$$

θ$_c$ calculated by using Equation 3 is 39.56°.

Here, since θ3 is higher than θ$_c$, the light (L2) is totally reflected at the inclined plane. In other words, the light (L1) outputted from the light guiding plate 334 is condensed by the prism 404.

Hereinafter, the backlight unit 302 of the present invention will be compared with other backlight unit described in the Related Art.

In the other backlight unit, a light outputted from a light guiding plate may be transmitted to direction different from the direction of a LCD panel by a prism sheet. As a result, the efficiency of the light transmitted to the LCD panel from the backlight unit is reduced.

In the backlight unit 302 of the present invention, the light outputted from the light guiding plate 334 is totally reflected at the inclined planes of the prisms 404. Hence, the light outputted from the light guiding plate 334 is not transmitted to direction different from the LCD panel 300, and so the efficiency of the light transmitted to the LCD panel 300 is enhanced.

Hereinafter, the backlight unit 302 of the present invention and the other backlight unit described in the Related Art will be compared in view of polarization efficiency.

Generally, a Brewster angle is calculated by using the following Equation 4, wherein the Brewster angle means an incident angle at which a light is not reflected.

$$n=\tan\theta_B, \text{ wherein n is the refractive index of the prism 404, } \theta_B \text{ is a Brewster angle.} \quad \text{[Equation 4]}$$

For example, the refractive index of the prism 404 is 1.57, and the angle between a light outputted from a light guiding plate and the normal of the light guiding plate is 60°.

In this case, θ$_B$ calculated by using Equation 4 is 57.5°.

In brief, in the prism sheet 400 of the backlight unit 302 of the present invention, an incident angle of the light incident to the vertical plane of the prism 404 is about 30°. However, in the prism sheet of the other backlight unit, an angle between a light transmitted through a prism (for example, L2 as shown in FIG. 2C) and the normal of an incident plane corresponding to the light (L2), i.e., an incident angle of the light (L2) is smaller than about 30°. In other words, the incident angle in the backlight unit 302 of the present invention is greater than that in the other backlight unit, and so is nearer to Brewster angle than that in the other backlight unit. Hence, the backlight unit 302 of the present invention has excellent polarization characteristics compared to the other backlight unit.

Generally, a LCD displays an image using P wave or S wave of a light emitted from a light source. Therefore, the more the light provided from a backlight unit has excellent polarization characteristics, the more the LCD has excellent brightness characteristics. Accordingly, since the backlight unit 302 of the present invention has excellent polarization characteristics than the other backlight unit, the LCD employing the backlight unit 302 of the present invention has excellent brightness characteristics than the LCD employing the other backlight unit.

Figure 6:
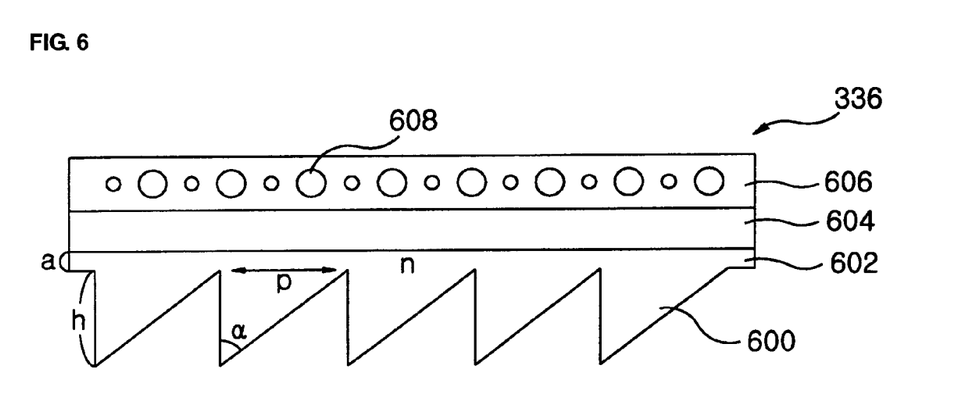
FIG. 6 is a sectional view illustrating the optical film of FIG. 3 according to a second embodiment of the present invention.

FIG. 6 is a sectional view illustrating the optical film of FIG. 3 according to a second embodiment of the present invention.

In FIG. 6, the optical film 336 is made up of only prism sheet.

The prism sheet includes prisms 600, a prism base 602, a base film 604 and a diffusion layer 606.

Since the elements of the prism sheet except the diffusion layer 606 are the same as in the embodiment 1, any further detailed description concerning the same elements will be omitted.

The diffusion layer 606 includes beads 608 which are made up of PMMA, and diffuses a light transmitted through the prisms 600, a prism base 602 and the base film 604 using the beads 608. In other words, the diffusion layer 606 performs the same as the protection sheet 402 in the embodiment 1.

Figure 7:
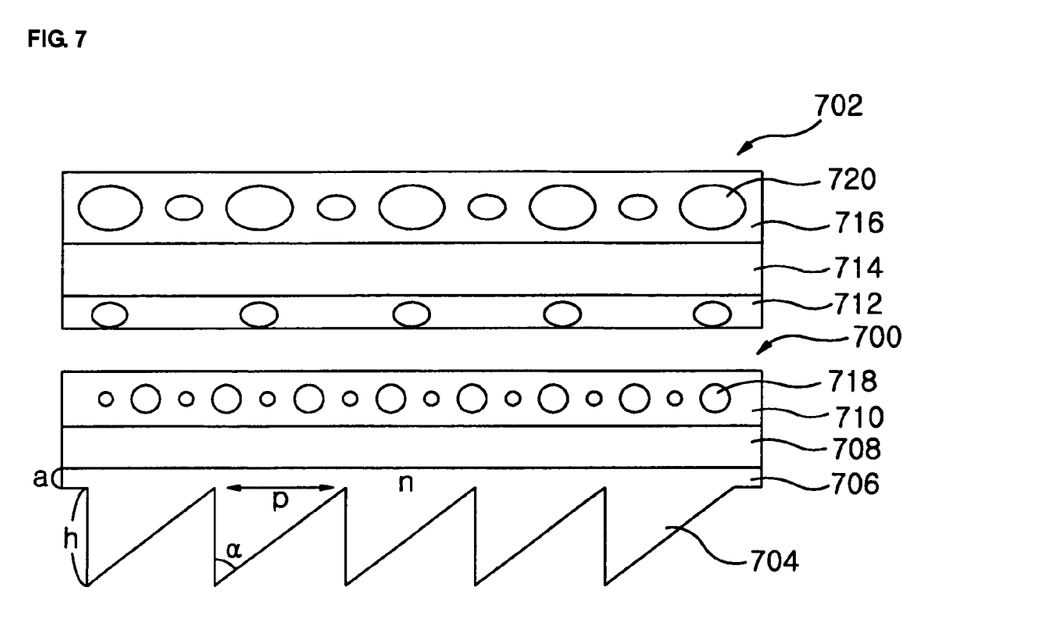
FIG. 7 is a sectional view illustrating the optical film of FIG. 3 according to a third embodiment of the present invention.

FIG. 7 is a sectional view illustrating the optical film of FIG. 3 according to a third embodiment of the present invention.

In FIG. 7, the optical film 336 includes a prism sheet 700 and a protection film 702.

The prism sheet 700 includes prisms 704, a prism base 706, a base film 708 and a diffusion layer 710. The diffusion layer 710 includes beads 718 which are made up of PMMA, and diffuses a light transmitted through the prisms 704, a prism base 706 and the base film 708 using the beads 718.

The protection sheet 702 diffuses a light condensed and diffused by the prism sheet 700 by using beads 720. The protection sheet 702 is located over the prism sheet 700, and includes a lower protection sheet 712, a protection sheet base film 714 and an upper protection sheet 716.

From the preferred embodiments for the present invention, it is noted that modifications and variations can be made by a person skilled in the art in light of the above teachings. Therefore, it should be understood that changes may be made for a particular embodiment of the present invention within the scope and the spirit of the present invention outlined by the appended claims.

What is claimed is:

1. A prism sheet comprising:
   a base film; and
   a plurality of linearly aligned prisms formed on a light incident portion of the base film,
   wherein each prism includes a vertical plane and an inclined plane, and a height of the vertical plane is equal to or larger than a pitch of the prism.

2. The prism sheet of claim 1, further including:
   a prism base located between the base film and the prisms to combine the base film with the prisms.

3. The prism sheet of claim 2, wherein a height of the prism base is more than 10 percents of the height (h) of the vertical plane of the prism.

4. The prism sheet of claim 1, wherein the pitch of the prism is about between 10 μm and 100 μm.

5. The prism sheet of claim 1, wherein each of the prisms is made up of UV curable resin having a refractive index of about 1.5 to 1.6.

6. The prism sheet of claim 5, wherein an angle between the vertical plane and the inclined plane in the prism is about 30° to 45°.

7. A prism sheet comprising:
   a base film;
   a plurality of linearly aligned prisms formed on a light incident portion of the base film; and
   a diffusing layer located on the base film, and having a plurality of beads for diffusing a light condensed by the prisms,
   wherein each prism includes a vertical plane and an inclined plane, and a height of the vertical plane is equal to or larger than a pitch of the prism.

8. The prism sheet of claim 7, wherein each of the beads is made up of poly methyl meta acrylate (PMMA).

9. A backlight unit employed in a liquid crystal display, comprising:
   a light guiding plate
   a prism sheet having a base film, and a plurality of linearly aligned prisms formed on a light incident portion of the base film and facing the light guiding plate,
   wherein each prism includes a vertical plane and an inclined plane, and a height of the vertical plane is equal to or larger than a pitch of the prism, and
   wherein an angle between the vertical plane and the inclined plane in each prism is about 30° to 45°, and the refractive index of substance of the prisms is about 1.5 to 1.6.

10. The backlight unit of claim 9, further including:
    a protection sheet located on the prism sheet, for diffusing light condensed by the prism sheet.

* * * * *